(12) United States Patent
Mouton et al.

(10) Patent No.: US 10,280,941 B2
(45) Date of Patent: May 7, 2019

(54) GUIDE DEVICE FOR VARIABLE PITCH STATOR VANES OF A TURBINE ENGINE, AND A METHOD OF ASSEMBLING SUCH A DEVICE

(71) Applicant: SAFRAN AIRCRAFT ENGINES, Paris (FR)

(72) Inventors: Clementine Charlotte Marie Mouton, Moissy-Cramayel (FR); Olivier Belmonte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 384 days.

(21) Appl. No.: 15/100,205

(22) PCT Filed: Nov. 19, 2014

(86) PCT No.: PCT/FR2014/052958
§ 371 (c)(1),
(2) Date: May 27, 2016

(87) PCT Pub. No.: WO2015/079144
PCT Pub. Date: Jun. 4, 2015

(65) Prior Publication Data
US 2017/0261003 A1 Sep. 14, 2017

(30) Foreign Application Priority Data
Nov. 29, 2013 (FR) ...................................... 13 61878

(51) Int. Cl.
*F04D 29/56* (2006.01)
*F04D 29/64* (2006.01)
*F01D 17/16* (2006.01)

(52) U.S. Cl.
CPC ......... *F04D 29/563* (2013.01); *F01D 17/162* (2013.01); *F04D 29/642* (2013.01); *F04D 29/644* (2013.01); *Y02T 50/671* (2013.01)

(58) Field of Classification Search
CPC .... F01D 17/162; F04D 29/563; F04D 29/642; F04D 29/644; Y02T 50/671
See application file for complete search history.

(56) References Cited

U.S. PATENT DOCUMENTS 4,498,790 A  2/1985  Fisher
4,604,030 A * 8/1986  Naudet ................. F01D 11/001
                                                      415/126

(Continued)

FOREIGN PATENT DOCUMENTS

CN      102656371 A      9/2012
DE  10 2005 042 747 A1   3/2007

(Continued)

OTHER PUBLICATIONS

International Search Report dated Mar. 6, 2015, in PCT/FR2014/052958 filed Nov. 19, 2014.

*Primary Examiner* — Igor Kershteyn
(74) *Attorney, Agent, or Firm* — Oblon, McClelland, Maier & Neustadt, L.L.P.

(57) ABSTRACT

A device for guiding variable pitch stator vanes of a turbine engine is provided. The device includes a plurality of inner ring angular sectors arranged end-to-end in order to form an inner ring, each inner ring sector having chimneys passing radially through the inner ring sector, a plurality of cylindrical bushings, each being put into place in a chimney of the inner ring from the inside and each serving to receive a guide pivot of a stator vane, a plurality of reconstitution ring angular sectors arranged end-to-end in order to form a reconstitution ring and put into place radially from the inside against the inner ring, and a plurality of blocking elements (Continued)

passing axially through the inner and reconstitution rings in order to assemble the rings together.

11 Claims, 3 Drawing Sheets

(56) References Cited

U.S. PATENT DOCUMENTS

| | | | | |
|---|---|---|---|---|
| 4,706,354 | A * | 11/1987 | Naudet | F01D 17/162 29/428 |
| 6,129,512 | A * | 10/2000 | Agram | F01D 17/162 415/160 |
| 7,360,990 | B2 * | 4/2008 | Barbe | F01D 17/162 384/296 |
| 7,510,369 | B2 * | 3/2009 | Lytle | F01D 17/162 29/889.22 |
| 8,376,692 | B2 * | 2/2013 | Stiehler | F01D 9/042 415/160 |
| 2003/0113204 | A1 * | 6/2003 | Wolf | F01D 17/162 415/165 |
| 2006/0056963 | A1 * | 3/2006 | Abadie | F01D 9/042 415/191 |
| 2009/0067978 | A1 | 3/2009 | Suljak, Jr. | |
| 2009/0087304 | A1 * | 4/2009 | Lejars | F01D 5/3023 415/160 |
| 2011/0293406 | A1 * | 12/2011 | Abadie | F01D 17/162 415/160 |
| 2013/0028716 | A1 | 1/2013 | Bouru et al. | |
| 2013/0230388 | A1 | 9/2013 | Kraus et al. | |

FOREIGN PATENT DOCUMENTS

| | | |
|---|---|---|
| EP | 0 204 615 A1 | 12/1986 |
| EP | 1 635 039 A1 | 3/2006 |
| EP | 2 031 188 A1 | 3/2009 |
| FR | 2 874 977 A1 | 3/2006 |
| WO | WO 98/09066 A1 | 3/1998 |
| WO | WO 2010/079204 A1 | 7/2010 |

* cited by examiner

GUIDE DEVICE FOR VARIABLE PITCH STATOR VANES OF A TURBINE ENGINE, AND A METHOD OF ASSEMBLING SUCH A DEVICE

BACKGROUND OF THE INVENTION

The present invention relates to the general field of turbine engine compressors, and in particular for an airplane turbojet or turboprop. The invention relates more particularly to a device enabling the variable pitch stator vanes of a compressor stage to be guided.

The high-pressure compressor of an aviation turbine engine comprises a plurality of variable pitch stator vane stages alternating with stages of rotor blades. The stator vanes serve to modify the flow characteristics of gas depending on the operating speeds of the turbine engine.

Each variable pitch stator vane has a control pivot at its tip and a guide pivot at its root, the control pivot passing through a stator shell (referred to as a casing) of the turbine engine and co-operating with a member for controlling the pitch angle of the vanes, with the guide pivot being pivotally movable in a bushing housed in a recess in an inner ring of the turbine engine. By acting on the control member, it is thus possible to modify the pitch angle of the blades in the stage in question. Reference may be made to Documents FR 2 556 410 and FR 2 723 614, which describe various configurations for guiding such variable pitch stator vanes.

The compressor casing is generally made as two half-shells in order to make it easier to put into place. In order to reduce the weight and increase the performance of the assembly as a whole, proposals have been made to make the shell as a single piece (360°). Unfortunately, when the compressor casing is a single piece in the tangential direction, it becomes considerably more complicated to put the various portions of the compressor into place. In particular, having recourse to a casing made of two half-shells enables the stator elements of the compressor to be put into place individually, which stator elements can then surround the elements of the rotor.

With a single-piece casing, it is necessary to assemble in alternation a rotor stage and then a stator stage. Unfortunately, in certain compressor configurations, the rotor stage situated downstream from the stator stage that is to be put into place cannot be moved downstream because of the slope of the casing. Thus, under such circumstances, the only way the stator vanes can be inserted in their housings is to move the inner ring as far as possible towards the rotor disk situated downstream. Unfortunately, this manipulation does not always make it possible to insert the stator vanes without damaging them.

Furthermore, in order to dimension the rotor line of the compressor, the shroud line of the compressor needs to be as close as possible to the flow passage for the gas stream passing therethrough. This has the consequence of reducing space beneath the passage, which makes it necessary to reduce the radial size of the guide device for the stator vanes.

OBJECT AND SUMMARY OF THE INVENTION

A main object of the present invention is thus to propose a variable pitch stator vane guide device that does not present such drawbacks.

In accordance with the invention, this object is achieved by a device for guiding variable pitch stator vanes of a turbine engine, the device comprising a plurality of inner ring angular sectors arranged end-to-end in a circumferential direction in order to form an inner ring, each inner ring sector having chimneys passing radially through the inner ring sector, a plurality of cylindrical bushings, each being put into place in a chimney of the inner ring from the inside and each serving to receive a guide pivot of a stator vane, a plurality of reconstitution ring angular sectors arranged end-to-end in a circumferential direction in order to form a reconstitution ring and put into place radially from the inside against the inner ring, and a plurality of blocking elements passing axially through the inner and reconstitution rings in order to assemble said rings together.

The device of the invention is remarkable in that the various elements making it up (inner ring sectors, reconstitution ring sectors, and bushings) and the stator vanes can be put into place by operations that take place entirely in radial directions (from the inside towards the outside). As a result, it is possible to avoid any interaction between the rotor and the stator while putting a stator stage into place after a rotor stage has been assembled. This device is thus well adapted to compressor casings that are in the form of a single piece (in the tangential direction). In addition, the radial size of such a device is limited.

Preferably, each reconstitution ring sector presents a channel section with an inner portion forming a web and two side edges extending radially outwards. Under such circumstances, each side edge of each reconstitution ring sector may present orifices for passing a blocking element.

Also preferably, the reconstitution ring sectors are put into place against the inner ring in such a manner as to cover the inter-sector zones of the inner ring. Such ring sector overlap serves to improve overall sealing and stiffness.

Also preferably, each reconstitution ring sector presents cutouts at its tangential ends for improving overall sealing. Likewise, still for the purpose of improving sealing, the device may also have sealing plates positioned between two adjacent inner ring sectors.

Each inner ring sector may present a hole that is angularly positioned between two adjacent chimneys and that passes axially right through the inner ring sector in order to pass a blocking element. Each of these blocking elements may comprise a bolt that is tightened in a crimped nut.

Advantageously, each reconstitution ring sector carries on an inside face a support for an abradable coating for co-operating with wipers carried by a rotor.

The invention also provides a turbine engine compressor including at least one device as defined above and a turbine engine including such a compressor.

The invention also provides a method of assembling a guide device for variable pitch stator vanes in a turbine engine as defined above, the method comprising in succession inserting control pivots for stator vanes through a single-piece casing shell, putting the set of inner ring sectors into place radially while inserting the guide pivots of the stator vanes in the chimneys of said inner ring sectors, inserting bushings from the inside into the inner ring sector chimneys in order to take up the clearance that exists between the chimneys and the vane guide pivots so as to enable the inner ring sectors to be put into place, assembling the reconstitution ring sectors radially from the inside against the inner ring sectors, and inserting blocking elements in the inner ring sectors and the reconstitution ring sectors in order to assemble the rings together.

The method may also include positioning sealing plates between two adjacent inner ring sectors.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
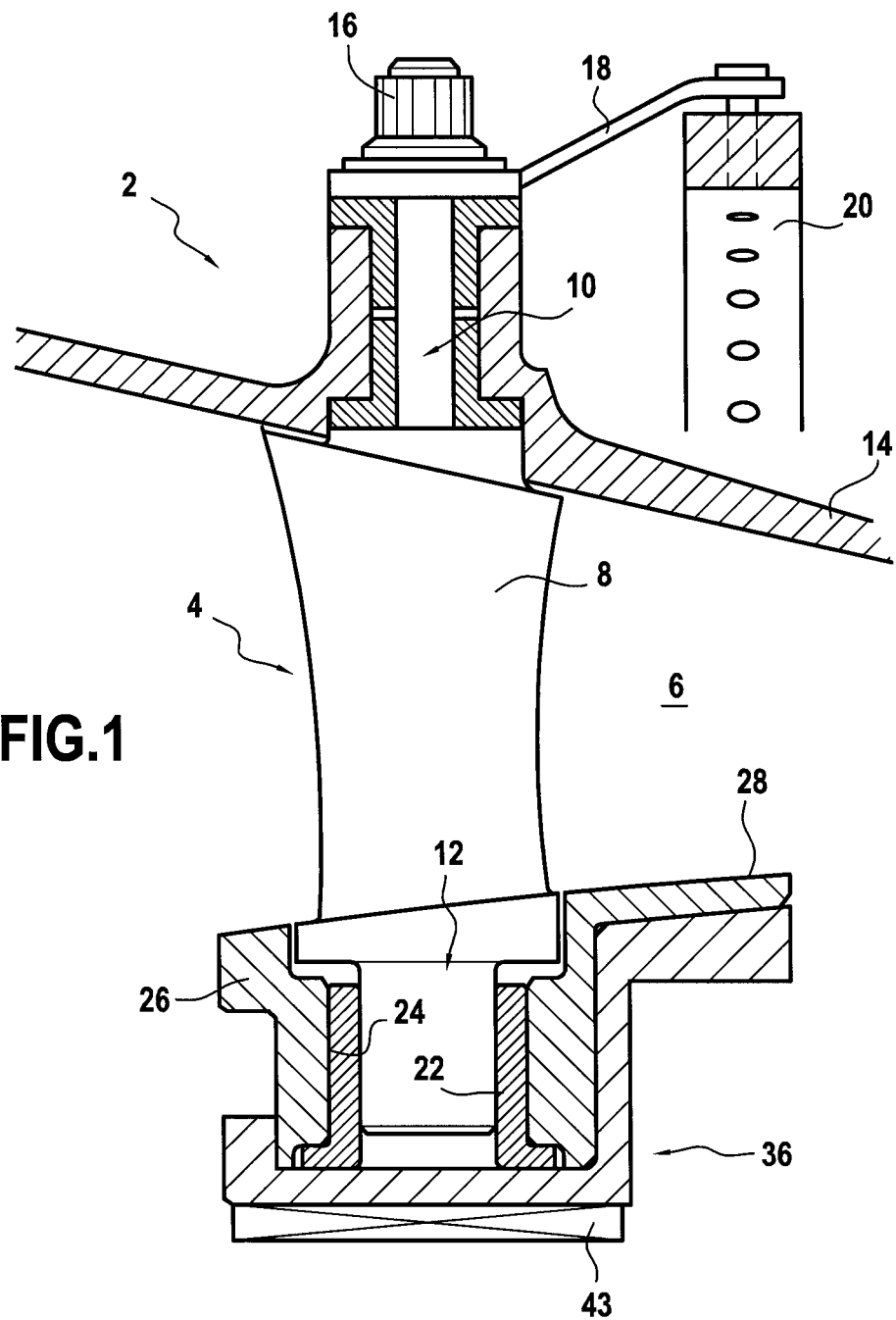
FIG. 1 is a diagrammatic view of a compressor stator stage having a vane guide device of the invention.

FIG. 1 is a diagram of a stator stage 2 of an aviation turbine engine compressor, e.g. a high-pressure compressor of a turbojet or of a turboprop for an airplane. Such a stator stage is arranged upstream from a rotor stage (not shown) of the compressor.

The stator stage 2 comprises a plurality of stator vanes 4 of variable pitch that are arranged in the passage 6 for passing the flow of gas passing through the compressor.

Each variable pitch vane 4 is in the form of an airfoil 8 terminating at a radially outer end (or vane tip) in a control pivot 10 (or top pivot), and at a radially inner end (or vane root) in a guide pivot 12 (or bottom pivot).

The control pivot 10 of the vane 4 passes through a turbine engine casing shell 14 that is in one piece (in the tangential direction) and it co-operates with a member for controlling the pitch angle of the vanes. For this purpose, the control pivot is typically terminated by a head 16 having engaged thereon an end of a control rod 18 whose other end co-operates with a control ring 20.

The control rods 18 and the control ring 20 form the pitch control member for the vanes 4. Turning the control ring about the longitudinal axis of the turbine engine serves to turn the control rods, and thus to modify simultaneously the pitch angle of all of the variable pitch vanes of the compressor stage.

Each guide pivot 12 is designed to turn in a hollow cylindrical bushing 22 forming a pivot support. These bushings 22 are housed in chimneys 24 formed in an inner ring 26 of the turbine engine, the bushing and the corresponding chimney being substantially complementary in shape.

More precisely, in accordance with the invention, the inner ring in which the chimneys 24 are formed is sectorized, i.e. is in the form of a plurality of angular sectors of the inner ring 26a (e.g. more than eight sectors, and preferably more than 12), which sectors are arranged end-to-end in the tangential direction to form a 360° ring.

Figure 2:
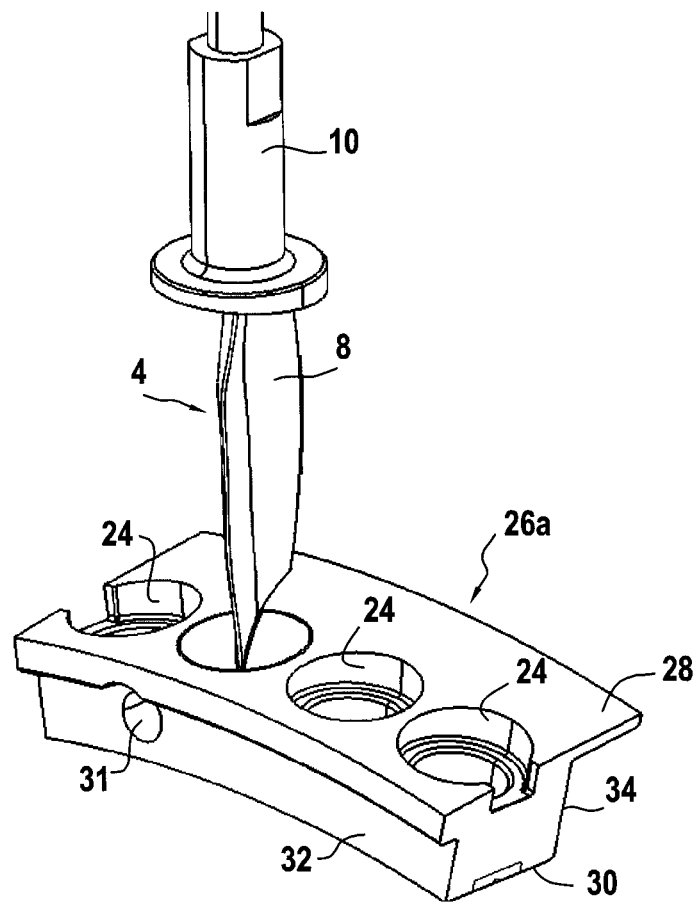
FIG. 2 is a perspective view of an inner ring sector of the FIG. 1 guide device.

FIG. 2 is a perspective view showing an inner ring sector 26a. It comprises an outer face 28 for defining the inside of the flow passage of the gas stream passing through the compressor, and an inner face 30 that is radially opposite from the outer face. The chimneys 24 (there being four of them for a single inner ring sector) pass radially right through the inner ring sector between its outer and inner faces.

Each inner ring sector 26a also has a hole 31 that is angularly positioned between two adjacent chimneys and that passes axially right through the inner ring sector between an upstream side face 32 and a downstream side face 34 of the inner ring sector. The hole 31 is for passing a blocking element as described below.

Furthermore, the guide device of the invention has a reconstitution ring 36 for assembling radially against the inner ring 26 from the inside.

To this end, the reconstitution ring is sectorized, i.e. it is likewise in the form of a plurality of angular reconstitution ring sectors 36a (e.g. more than eight, and preferably more than 12) that are placed end to end in the tangential direction to form a 360° ring. The number of reconstitution ring sectors is selected in such a manner that a reconstitution ring sector overlaps at least two adjacent inner ring sectors 26a (as shown in FIG. 4).

Figure 3:
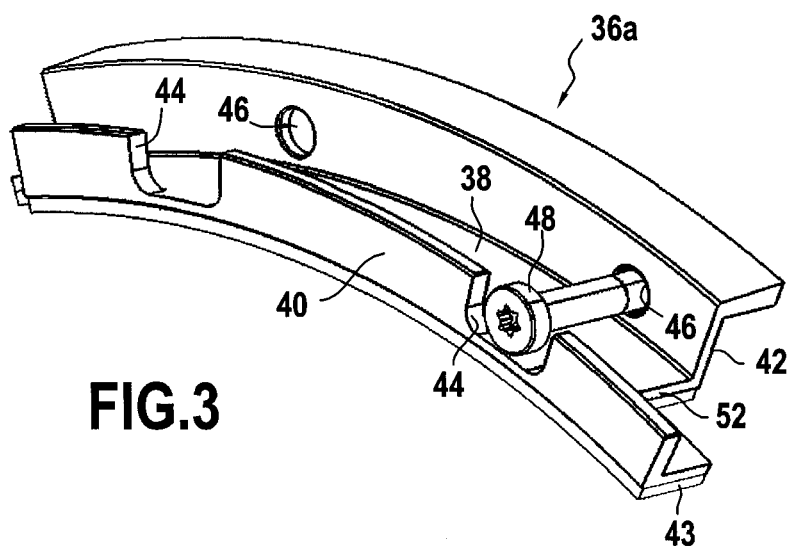
FIG. 3 is a perspective view of a reconstitution ring sector of the FIG. 1 guide device.

FIG. 3 is a perspective view of a reconstitution ring sector 36a. It presents channel section, having an inner portion 38 forming a web and two side edges, namely an upstream side edge 40 and a downstream side edge 42, that extend radially outwards. This channel section enables the side faces 32 and 34 and the inner face 30 of an inner ring sector 26a to be received radially. On its inside face, the web 38 carries a support for an abradable coating 43 that is to co-operate with wipers carried by a rotor (not shown in the figures).

Each of the side edges 40 and 42 of each reconstitution ring sector 36a presents orifices for passing a blocking element. More precisely, in the example shown in FIG. 3, the upstream side edge 40 of each reconstitution ring sector has two notches 44, and the downstream side edge 42 has two holes 46 for passing blocking elements.

Figure 4:
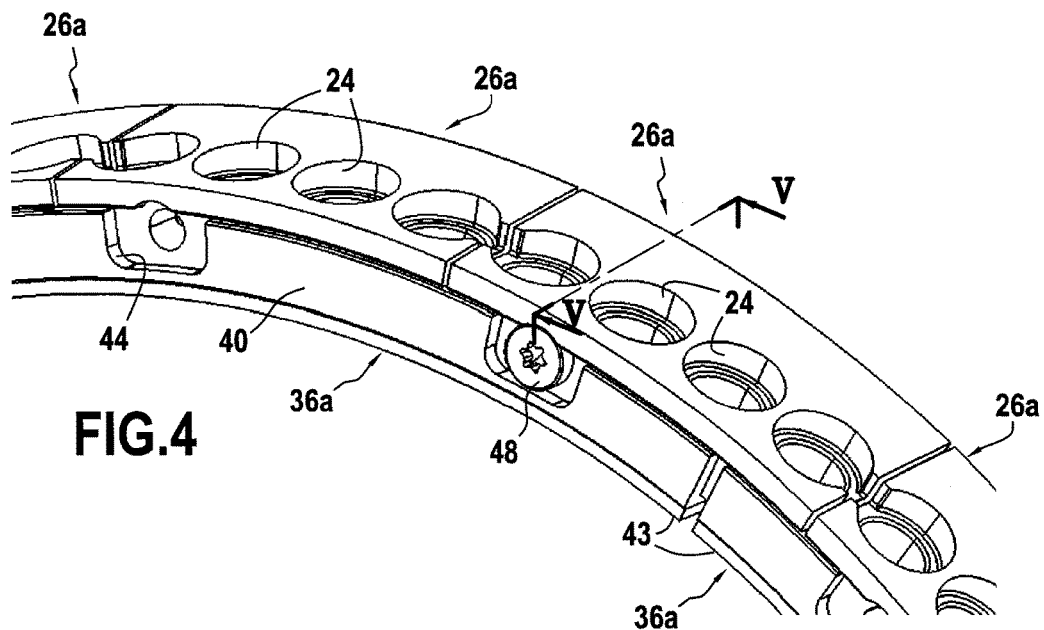
FIG. 4 is a perspective view showing a plurality of inner ring sectors associated with one another and with reconstitution ring sectors of the FIG. 1 guide device.
Figure 5:
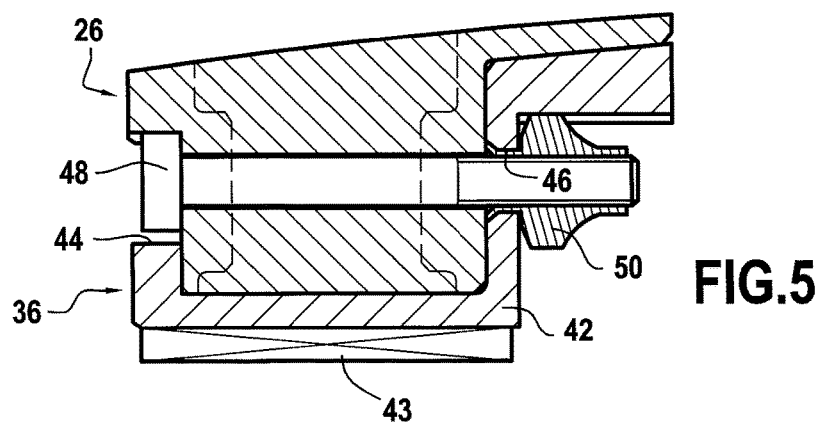
FIG. 5 is a section view on V-V of FIG. 4.

As shown in FIGS. 3 to 5, each of the blocking elements in this example comprises a bolt 48 that is tightened in a crimped nut 50, the bolt being assembled from upstream to downstream and the nut being crimped in a reconstitution ring sector 36a.

The way the guide device of the invention is put into place stems in obvious manner from the above. Once the blades of the rotor stage situated immediately downstream from the stator stage 2 have been put into place, the control pivots 10 of the vanes 4 are put into place radially from the inside in their housings in the casing shell 14. The inner ring sectors 26a are then put into place radially from the inside by positioning the guide pivots 12 for the vanes in the chimneys 24 so as to form the inner ring 26.

The bushings 22 are then inserted radially from the inside into the chimneys 24 around the guide pivots 12 of the vanes in order to take up the assembly clearances that exist between the chimneys and the guide pivots of the vanes so as to enable the inner ring sectors to be put into place.

The reconstitution ring sectors 36a are then assembled against the inner ring sectors 26a, by positioning them radially from the inside against the inner ring sectors. More precisely, the reconstitution ring sectors are put into place in such a manner as to cause the holes 31 formed in the inner ring sectors to coincide angularly with the notches 44 and the holes 46 formed in the reconstitution ring sectors.

Furthermore, and preferably, as shown in FIG. 4, the reconstitution ring sectors 36a are put into place against the inner ring in such a manner as to cover the inter-sector zones of the inner ring so as to improve the sealing of the assembly.

Once the reconstitution ring sectors have been put into place, the bolts 48 are inserted through the holes 31 formed in the inner ring sectors and they are tightened in the nuts 50 that have previously been crimped against the downstream side edge 42 of the reconstitution ring sectors. The bolts thus serve to prevent the reconstitution ring from moving tangentially.

The guide device of the invention is thus put into place by operations that take place solely in radial directions from the inside towards the outside.

In an advantageous arrangement shown in FIG. 3, each reconstitution ring sector 36a presents cutouts 52 at its tangential ends for improving the sealing of the assembly.

In another advantageous arrangement that is not shown in the figures, provision is made to position sealing plates between two adjacent inner ring sectors so as to improve the sealing of the assembly.

The invention claimed is:

1. A device for guiding variable pitch stator vanes of a turbine engine, the device comprising:
   a plurality of inner ring angular sectors arranged end-to-end in a circumferential direction in order to form an inner ring, each inner ring angular sector having chimneys passing radially through the inner ring sector;
   a plurality of cylindrical bushings, each cylindrical bushing being put into place in a chimney of the inner ring from an inside and each cylindrical bushing serving to receive a guide pivot of a stator vane;
   a plurality of reconstitution ring angular sectors arranged end-to-end in the circumferential direction order to form a reconstitution ring and put into place radially from an inside against the inner ring; and
   a plurality of blocking elements passing axially through the inner and reconstitution rings in order to assemble said rings together,
   wherein each reconstitution ring angular sector presents a channel section with an inner portion forming a web and two side edges extending radially outwards, and
   wherein each inner ring angular sector includes an inner face that is radially opposite from an outer face, and two side faces, the channel section of each reconstitution ring angular sector radially receiving the two side faces and the inner face of one of the inner ring angular sectors.

2. A device according to claim 1, wherein each side edge of each reconstitution ring annular sector presents orifices for passing a blocking element.

3. A device according to claim 1, wherein the reconstitution ring angular sectors are put into place against the inner ring in such a manner as to cover inter-sector zones of the inner ring.

4. A device according to claim 1, wherein each inner ring angular sector presents a hole that is angularly positioned between two adjacent chimneys and that passes axially right through the inner ring angular sector in order to pass a blocking element.

5. A device according to claim 1, wherein each blocking element comprises a bolt that is tightened in a crimped nut.

6. A device according to claim 1, wherein each reconstitution ring angular sector carries on an inside face thereof a support for an abradable coating for co-operating with wipers carried by a rotor.

7. A turbine engine compressor including at least one device according to claim 1.

8. A turbine engine including a compressor according to claim 7.

9. The device according to claim 1, wherein each reconstitution ring angular sector includes a downstream portion extending downstream from a radially outer end of a downstream side edge.

10. The device according to claim 1, wherein the web of the reconstitution ring angular sectors abuts the inner face of the inner ring angular sectors.

11. A method of assembling a guide device for variable pitch stator vanes in a turbine engine according to claim 1, the method comprising in succession:
    inserting control pivots for stator vanes through a single-piece casing shell;
    putting a set of inner ring angular sectors into place radially while inserting the guide pivots of the stator vanes in the chimneys of said inner ring angular sectors;
    inserting bushings from the inside into the inner ring angular sector chimneys in order to take up a clearance that exists between the chimneys and the guide pivots of the stator vanes so as to enable the inner ring angular sectors to be put into place;
    assembling the reconstitution ring angular sectors radially from the inside against the inner ring angular sectors; and
    inserting the blocking elements in the inner ring angular sectors and the reconstitution ring angular sectors in order to assemble the inner and reconstitution rings together.

* * * * *